(12) United States Patent
Palay et al.

(10) Patent No.: US 7,202,862 B1
(45) Date of Patent: Apr. 10, 2007

(54) PRESSURE SENSOR FOR A DIGITIZER PEN

(75) Inventors: Steven M. Palay, Cave Creek, AZ (US); Lynn H. Rockwell, Overgaard, AZ (US)

(73) Assignee: Finepoint Innovations, Inc., Phoenix, AZ (US)

( * ) Notice: Subject to any disclaimer, the term of this patent is extended or adjusted under 35 U.S.C. 154(b) by 604 days.

(21) Appl. No.: 10/791,973

(22) Filed: Mar. 3, 2004

(51) Int. Cl.
*G09G 5/00* (2006.01)

(52) U.S. Cl. .............. 345/179; 178/18.01; 178/19.01

(58) Field of Classification Search ............ 345/179; 178/19.01, 19.02, 19.03, 19.04, 18.01, 18.02, 178/18.03, 18.04, 18.05, 18.06
See application file for complete search history.

(56) References Cited

U.S. PATENT DOCUMENTS

| | | | |
|---|---|---|---|
| RE34,095 E | 10/1992 | Padula et al. | 178/18 |
| 5,357,062 A | 10/1994 | Rockwell et al. | 178/18 |
| 5,571,997 A | 11/1996 | Gray et al. | 178/18 |
| 5,581,052 A | 12/1996 | Padula et al. | 178/18 |
| 5,633,471 A | 5/1997 | Fukushima | 73/865.4 |
| 6,252,182 B1 | 6/2001 | Lai | 178/19.04 |
| 6,288,711 B1 * | 9/2001 | Tanaka et al. | 345/179 |

* cited by examiner

*Primary Examiner*—Richard Hjerpe
*Assistant Examiner*—Jean Lesperance

(74) *Attorney, Agent, or Firm*—Cahill, von Hellens & Glazer, P.L.C.

(57) ABSTRACT

A digitizer pen (100) has a pressure sensor (104) that includes a flexible first printed component (600) and a flexible second printed component (700), on which are printed or otherwise disposed traces of non-carbon ink. The non-carbon ink on at least one of the printed components is a resistive non-carbon ink (606 and 706). The first printed component has a circular sensor section (602) that opposes a circular sensor section (702) of the second printed component. The non-carbon ink on the circular sensor section of at least one of the printed components forms a pattern of pie-shaped traces (711–716) symmetrical about a center (1000) of the circular sensor section. A stylus (130) transfers force from a writing tip (136) to the pressure sensor, at or near the center of the circular sensor section, either directly or through an elastomer (148), and presses the circular sensor sections together. The area of the non-carbon ink on one circular sensor section thereby pressed into intimate contact with the non-carbon ink on the other circular sensor section is proportional to the force. The pressure sensor has two terminals (901 and 902) electrically coupled to the inks on the circular sensor sections such that the electrical resistance between the terminals is proportional to the pressure. The electrical resistance is approximately the same when the stylus transfers a force at the center of the circular sensor section or when the stylus transfers the same force off-centered (1005). An electrical resistance versus force curve (1400) is selectable by preselecting the size or the shape, or both, of the ink traces of the pie-shaped pattern. The abstract is submitted with the understanding that it will not be used to interpret or limit the scope or meaning of the claims pursuant to 37 C.F.R. §172(b).

12 Claims, 13 Drawing Sheets

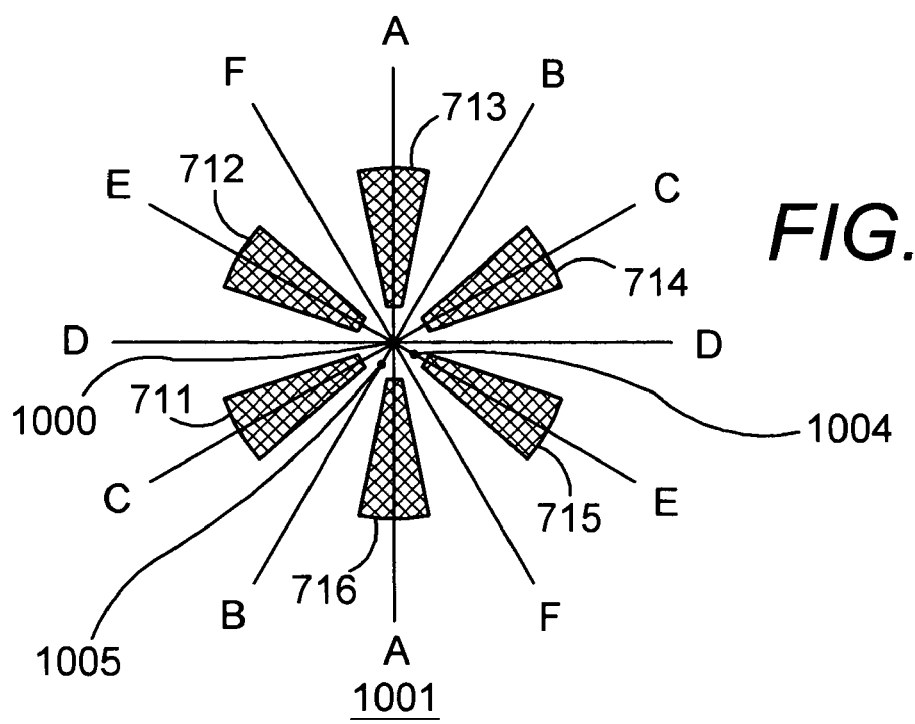
FIG. 10
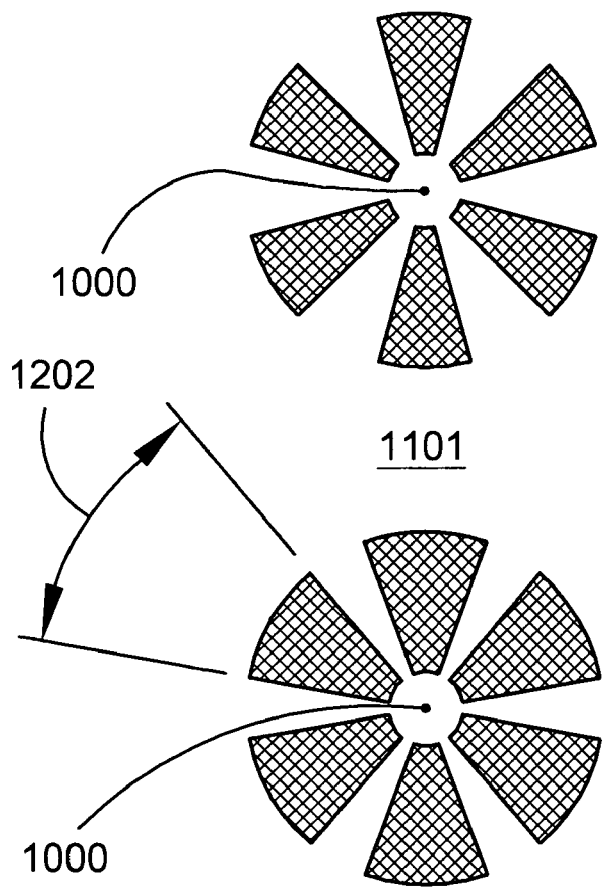
FIG. 11
FIG. 12
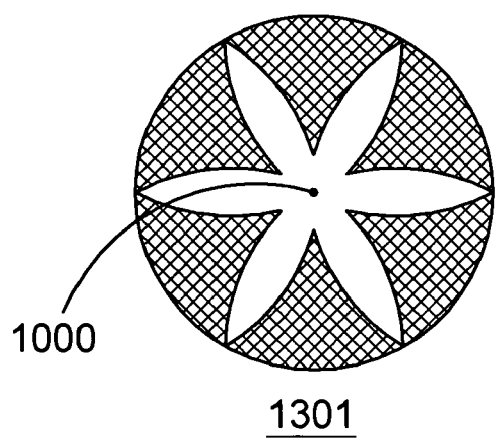
FIG. 13

PRESSURE SENSOR FOR A DIGITIZER PEN

BACKGROUND OF THE INVENTION

1. Field of the Invention

An operator-manipulable pointing device, e.g., a digitizer pen, which includes a digitizer stylus for touching a sensing surface, has a built-in pressure sensor that is automatically activated when the tip of the stylus applies a force on the sensing surface.

2. Description of the Related Art

Digitizer pens that include a stylus, which develop a signal output responsive to a longitudinal force on a writing tip of the stylus and which have a conductive member adjacent to a resistive member within the stylus, are well known. Such digitizer pens have a pressure sensor at an end of the stylus opposite the writing tip. Such pressure sensor includes a compression means for forcing the resistive member and the conductive member together in electrical contact over a contacting area that is directly proportional to an amount of longitudinal pressure of the writing tip. Such pressure sensor has two terminals, and the electrical conductance or electrical resistance between the two terminals constitutes an output of the pressure sensor.

For example, U.S. Pat. No. 5,357,062 entitled PRESSURE SENSING APPARATUS FOR DIGITIZER PEN TIP issued Oct. 18, 1994 to Rockwell et al., discloses a resistive member made from a carbon-impregnated elastomeric material, and a conductive member that includes a pair of rectangular-shaped, conductive silver ink traces on an insulating substrate. The aforementioned patent also discloses a conductive member comprising a piece of flexible rubber having a conductive coating, and a resistive member that includes a pair of triangular-shaped, carbon/silver ink traces on an insulating substrate. The triangular-shaped carbon/silver ink traces have their triangular apexes in adjacent proximity. The end of the stylus opposite the writing tip must be centered between the apexes of the triangular-shaped ink traces because when the end is off-centered, the output of the prior art pressure sensor is, disadvantageously, substantially different from the output when the end is centered.

Prior art pens have a known problem with the centering of the conductive ink traces or the resistive ink traces, or both, on their respective substrates during the printing process. Typical printing tolerance is ±5 mils. Prior art pens also have a known problem with the centering (with respect to the axis of the stylus) of the conductive ink traces or the resistive ink traces, or both, during assembly of the pen. Looking at the latter problem another way, prior art pens have a known problem with the centering of the stylus between the apexes of the two triangular-shaped conductive ink traces or the two triangular-shaped resistive ink traces, or both, during assembly of the pen. Prior art pens have another known problem of a properly assembled stylus becoming off-centered with respect to the apexes of the triangular-shaped ink traces, as a result of wear or misuse. Prior art pens also have the problem of a properly assembled stylus becoming off-centered with respect to the apexes of the triangular-shaped ink traces because of an accumulation of manufacturing tolerances. As a result, with standard manufacturing tolerances, some prior art digitizer pens would not function after having been seemingly properly assembled. In any case, prior art pens have a problem of the end of the stylus opposite the writing tip becoming off-centered with respect to ink traces on the pressure sensor.

With known digitizer pens, if the pressure to the pressure sensor is applied off-centered for one or more of the aforesaid reasons, a start-up characteristic occurs that is disadvantageously different from the start-up characteristic that occurs when the pressure is applied to the center of the pressure sensor.

Known pressure sensors for digitizer pens that use a force-sensitive, resistive ink, use a carbon-type ink. Disadvantageously, carbon-type inks tend to flake off a substrate. Carbon-type inks are formulated with other inks to produce a desired resistivity, and control of the formulation is very difficult.

OBJECTS OF THE INVENTION

It is therefore an object of the present invention to provide a pressure sensor for a digitizer stylus that uses an ink that wears longer.

Another object of the present invention is to provide a pressure sensor for a digitizer stylus that uses a non-carbon ink that can be easily formulated to maintain a desired resistivity range.

Still another object of the present invention is to provide a pressure sensor for a digitizer pen that uses an ink that does not readily flake off a substrate.

Yet another object of the present invention is to provide a pressure sensor for a digitizer pen that provides a more accurate control of the change in electrical resistance for changes in pressure.

A further object of the present invention is to provide a pressure sensor for a digitizer pen that provides more design flexibility with regard to start-up pressure, pressure range, and stylus travel.

Still a further object of the present invention is to provide a pressure sensor for a digitizer pen that provides an ability to control an electrical resistance versus pressure curve without alignment problems.

Yet a further object of the present invention is to provide a pressure sensor for a digitizer pen, which provides a consistent start-up characteristic each time the digitizer pen is used, regardless of whether the pressure is applied to the center of the pressure sensor or whether the pressure is applied off-centered.

These and other objects of the present invention will become apparent to persons skilled in the art as the description thereof proceeds.

SUMMARY OF THE INVENTION

Briefly described, and in accordance with a preferred embodiment thereof, the present invention relates to a pressure sensor in a digitizer pen. The pressure sensor comprises a first sensor section that has a non-carbon ink disposed thereon and a second sensor section that has a non-carbon ink disposed thereon. The second sensor section abuts the first sensor section.

Another aspect of the present invention relates to a pressure sensor for a digitizer pen, which comprises a first sensor section that has a conductive, non-carbon ink disposed thereon, and a second sensor section that has a resistive, non-carbon ink disposed thereon. The second sensor section abuts the first member. The resistive, non-carbon ink includes thermoplastic resin, silver, tin oxide, and diethylene glycol monobutyl ether acetate.

Still another aspect of the invention relates to a digitizer pen that comprises a pressure sensor mounted within the digitizer pen and a stylus mounted to the digitizer pen. The pressure sensor has a center and has output terminals. The stylus has a writing tip for touching a sensing surface and an end, opposite the writing tip, for applying force to the pressure sensor. An electrical conductance between the output terminals is proportional to the force. The electrical conductance in response to a given amount of force applied by the end of the stylus to the pressure sensor at the center is substantially the same as the electrical conductance in response to the given amount of force applied by the end of the stylus to the pressure sensor off-centered.

Yet another aspect of the invention relates to a pressure sensor in a digitizer pen that includes a stylus for applying force to the pressure sensor. The pressure sensor comprises at least one circular sensor section that has a plurality of traces of a non-carbon ink disposed thereon in a pattern symmetrical about the center of the sensor section, and two output terminals. An electrical conductance between the two output terminals is responsive to force applied by the stylus on the pressure sensor. A change in electrical conductance between the two output terminals in response to a change in force applied by the stylus to the pressure sensor is selectable by preselecting one or both of the shape of the races and the size of the traces.

Other aspects, features and advantages of the present invention will become apparent to persons skilled in the art from the following detailed description and the accompanying drawings. It should be understood however that the detailed description and specific examples, while indicating preferred embodiments of the present invention, are given by way of illustration only and various modifications may naturally be performed without deviating from the present invention.

BRIEF DESCRIPTION OF THE DRAWINGS

The present invention will be described with greater specificity and clarity with reference to the following drawings, in which:

FIG. 10 is a plan view of a pattern of ink traces having a first size;

FIG. 11 is a plan view of the pattern of ink traces having a second size;

FIG. 12 is a plan view of the pattern of ink traces having a third size;

FIG. 13 is a plan view of an alternative pattern of ink traces;

Figure 1:
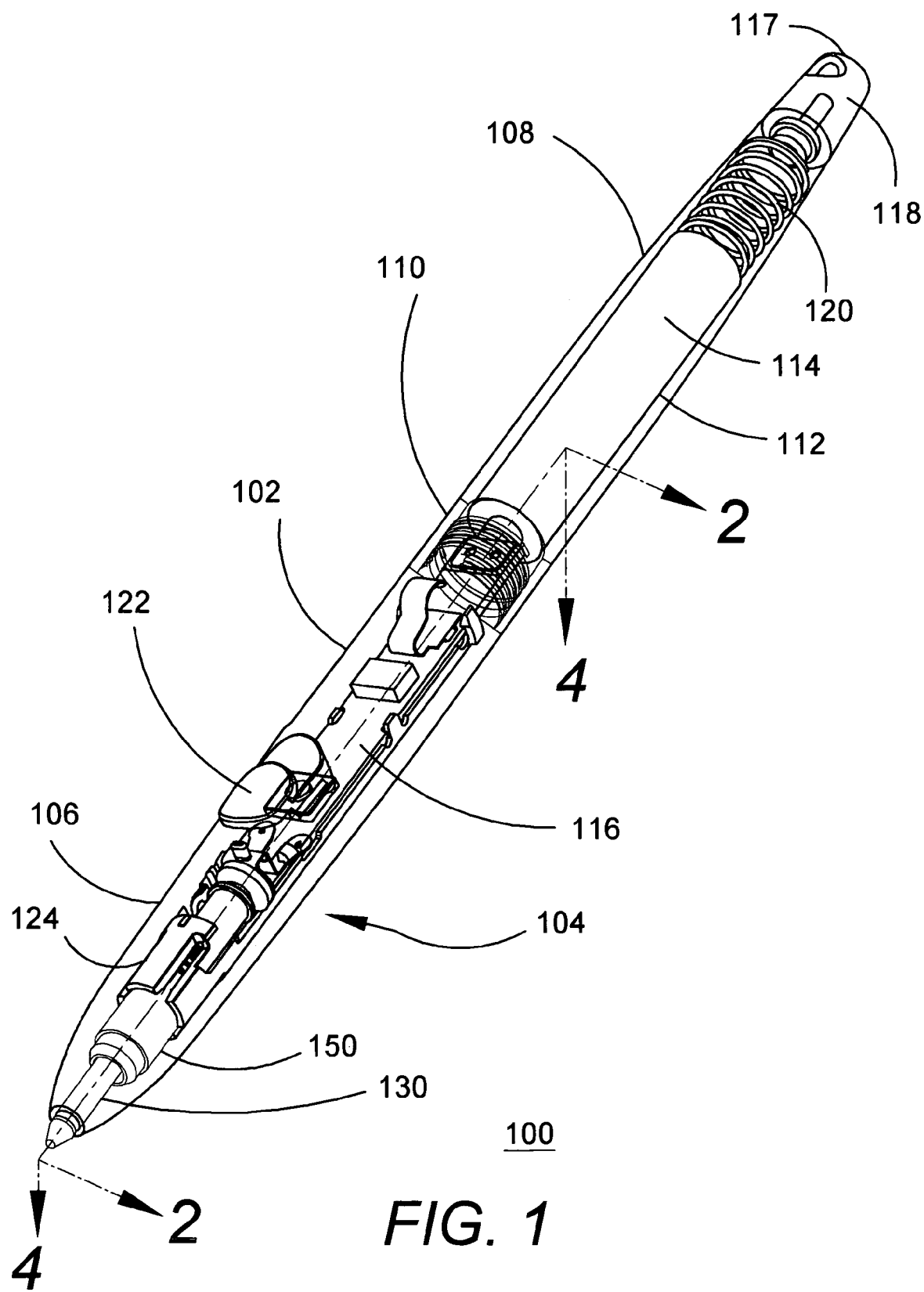
FIG. 1 is a perspective view of a digitizer pen that includes a pressure sensor in accordance with the invention.

For simplicity and clarity of illustration, the drawing figures illustrate the general manner of construction, and descriptions and details of well-known features and techniques are omitted to avoid unnecessarily obscuring the invention. Additionally, elements in the drawing figures are not necessarily drawn to scale.

DESCRIPTION OF THE PREFERRED EMBODIMENT

It should be understood that the embodiments discussed below are only examples of the many advantageous uses of the innovative teachings herein. In general, statements made in the specification of the present application do not necessarily limit any of the various claimed inventions. Some statements may apply to some inventive features but not to others. In general, unless otherwise indicated, singular elements may be in the plural and vice versa with no loss of generality. The terms first, second, third, and the like, in the description and in the claims, if any, are used for distinguishing between similar elements and not necessarily for describing a sequential or chronological order. The terms top, front, side, and the like, in the description and in the claims, if any, are used for descriptive purposes and not necessarily for describing relative positions. All measurements are approximate.

FIG. 1 is a perspective view of a digitizer pen 100 (hereinafter "pen") that comprises a barrel 102 and a pressure sensor 104 within the barrel. The barrel 102 comprises a front housing 106 and a rear housing 108 that are removably attached to each other by a threaded junction 110. The barrel 102 is preferably plastic. The pen 100 includes a compartment 112 for a battery 114 for supplying electrical power to an electronic circuit 116 mounted within the pen. At one end 117 of the pen 100 is an end cap 118. A spring 120 between the end cap 118 and the battery 114 holds the battery in place. A side button 122 is mounted to the front housing 106 and is electrically coupled to the electronic circuit 116.

Figure 2:
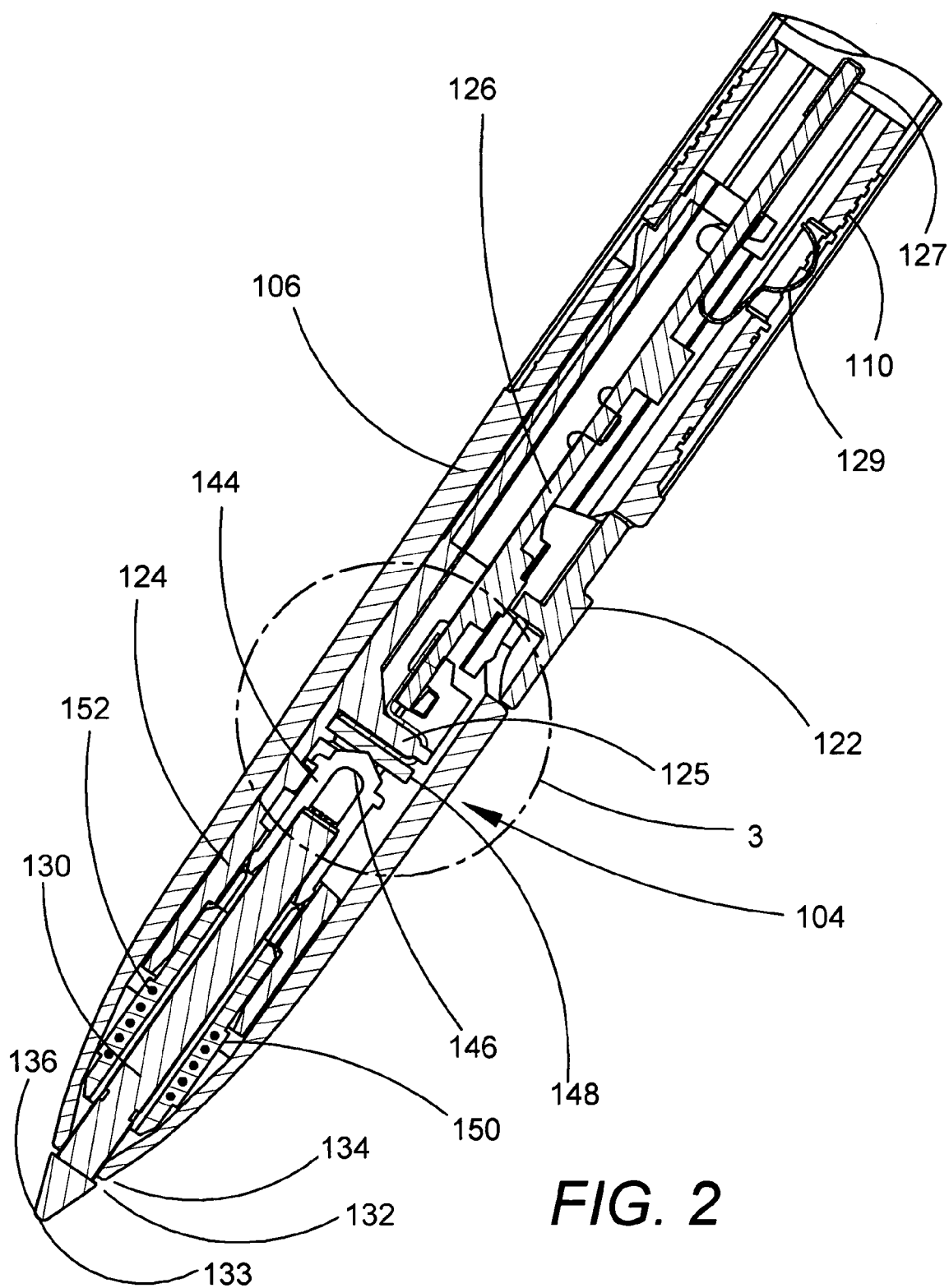
FIG. 2 is a cross-sectional view of a front housing of the digitizer pen of FIG. 1 through cut-line 2—2.

FIG. 2 is a cross-sectional view the front housing 106 of the pen 100 through cut-line 2—2. The front housing 106 is the lower portion of the pen 100 when held in a normal writing position with a sensing surface (not shown) below the pen. An inside holder 124 is fixedly mounted inside the front housing 106 of the pen 100. The inside holder 124 is preferably plastic. A printed circuit board 126, which includes the electronic circuit 116, is mounted to the inside holder 124. A battery contact 127 is mounted to the battery side of the printed circuit board 126. A clip 129 is mounted to the printed circuit board 126. A tip holder 144 is movably mounted within the front housing 106 of the pen 100. A removable stylus 130 has an end 146 that is friction-fit mounted within the tip holder 144. The stylus 130 is an elongated element that protrudes from an opening 132 of the barrel 102 at another end 134 of the pen 100 opposite the end cap 118. The stylus 130 is preferably plastic. The stylus 130 has a writing tip 136 at another end 133 of the stylus that protrudes from the barrel 102.

Figure 3:
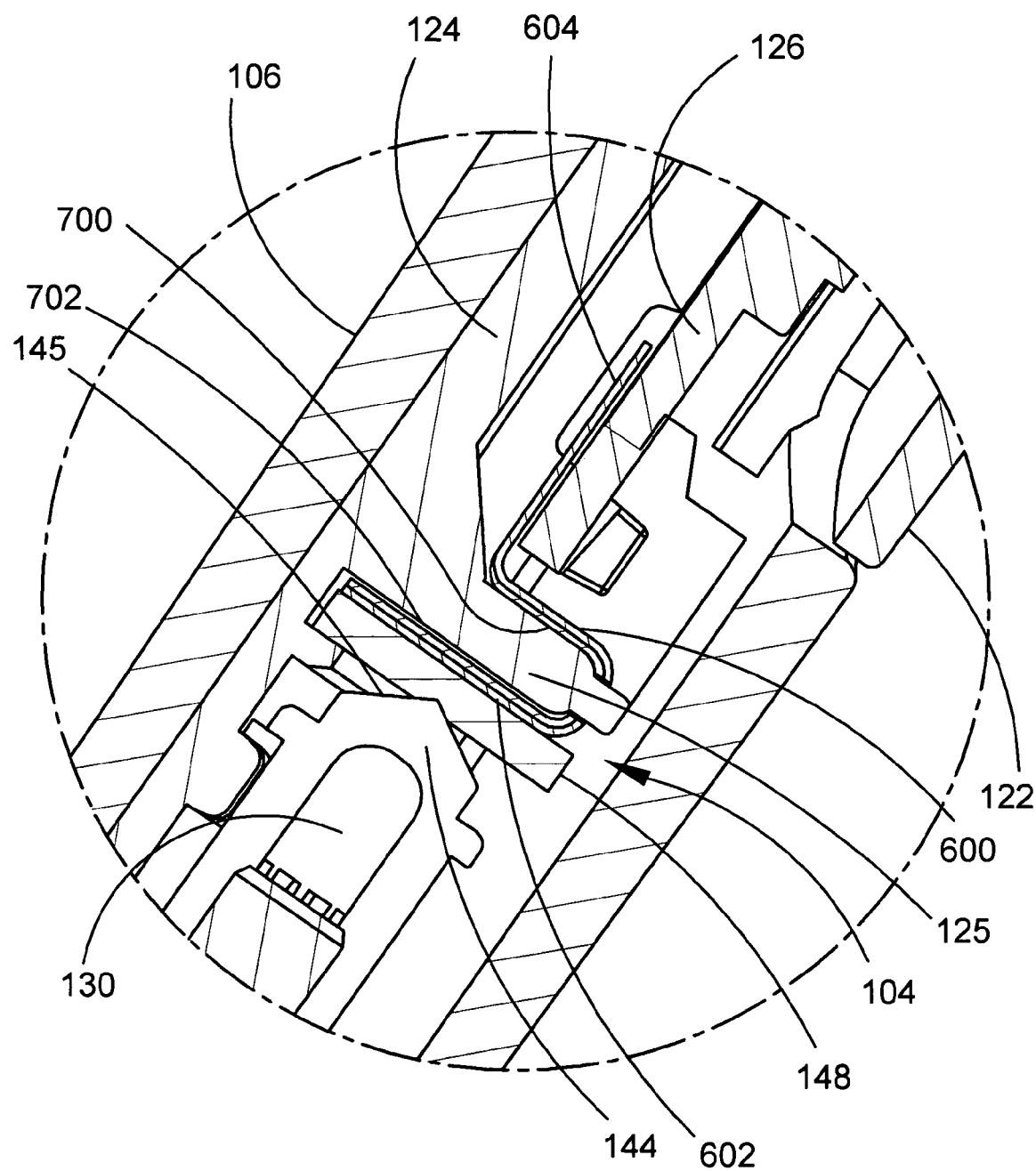
FIG. 3 is an enlargement of portion 3 of FIG. 2.

An elastomer disk 148 (hereinafter "elastomer") comprises a low durometer material, having a durometer value of approximately fifty-five (55), such as PORON® or another soft rubber or rubber-like material. The elastomer 148 is preferably mounted between the tip holder 144 and the pressure sensor 104. When the writing tip 136 of the stylus 130 is pressed against a sensing surface, such as a digitizer tablet, the end 146 of the stylus moves the tip holder 144 against the elastomer 148. The elastomer 148 transfers pressure from the tip holder to the pressure sensor. The pressure sensor 104 is mounted between the elastomer 148 and a portion 125 of the inside holder 124. Depending upon the shape of the face of the tip holder 144 and the durometer of the elastomer 148, the tip holder penetrates the elastomer a certain amount, such as is shown in FIGS. 2 and 3. Any additional movement, or travel, of the tip holder 144 toward the elastomer 148 causes the elastomer to move toward and actuate the pressure sensor 104. The pressure sensor 102 is substantially prevented from moving away from the elastomer 148 by portion 125, which is fixed. The force applied to the pressure sensor 104 by the elastomer 148 is an input to the pressure sensor. An output of the pressure sensor 104 is an electrical response that is preferably measured as either an electrical resistance (hereinafter "resistance") or an electrical conductance (hereinafter "conductance"). The pressure sensor 104 has a start-up pressure, which is defined as the minimum amount of pressure that produces an electrical response from the pressure sensor. The preferred embodiment results in a moderate start-up pressure and moderate distance of travel for the stylus 130.

Alternatively, an elastomer (not shown) is mounted between the pressure sensor 104 and the portion 125 of the inside holder 124; in which case, the tip holder 144 transfers pressure directly to the pressure sensor. The alternative embodiment results in a lower start-up pressure and moderate distance of travel for the stylus 130 and for the pressure sensor 102.

As a second alternative, two elastomers are used, one mounted at each of the aforesaid positions. With the second alternative embodiment, the pressure sensor 102 and the stylus 130 travel a greater distance than when only one elastomer is used, to obtain a required maximum pressure output from the pressure sensor. The second alternative embodiment results in a higher start-up pressure and a longer distance of travel for the stylus 130 and for the pressure sensor 102.

As a third alternative, no elastomer is used in either of the aforesaid positions, and the pressure sensor 104 and the stylus 130 travel a much shorter distance (than when only one elastomer is used) to obtain the required maximum pressure output from the pressure sensor. The third alternative embodiment results in a very low start-up pressure and a very short distance of travel for the stylus 130. In the third alternate embodiment, the pressure sensor 102 provides a very fast change in resistance (as the output) in response to a change in pressure (the input).

Generally, a softer (low durometer) elastomer 148 results in a longer distance of travel for the stylus 130. Generally, a harder (high durometer) elastomer 148 results in a shorter distance of travel for the stylus 130.

A bobbin 150 surrounds the stylus 130. A conductive coil 152, which acts as an antenna, is wrapped around the bobbin 150 and is electrically coupled to the electronic circuit 116. For simplicity of illustration, the conductive coil is shown having only five (5) loops, or turns, of wire, although the actual coil has a greater number of turns.

FIG. 3 is an enlargement of portion 3 of FIG. 2. The tip holder 144 has a face 145 that is adjacent to a tip side of the elastomer 148. The pressure sensor 104 is adjacent to other side of the elastomer 148. The face 145 of the tip holder 144 acts as an actuator for the pressure sensor 104. The pressure sensor 104 comprises a first printed component 600 and a second printed component 700. The first printed component 600 of the pressure sensor 104 is adjacent to the other side of the elastomer 148.

Figure 4:
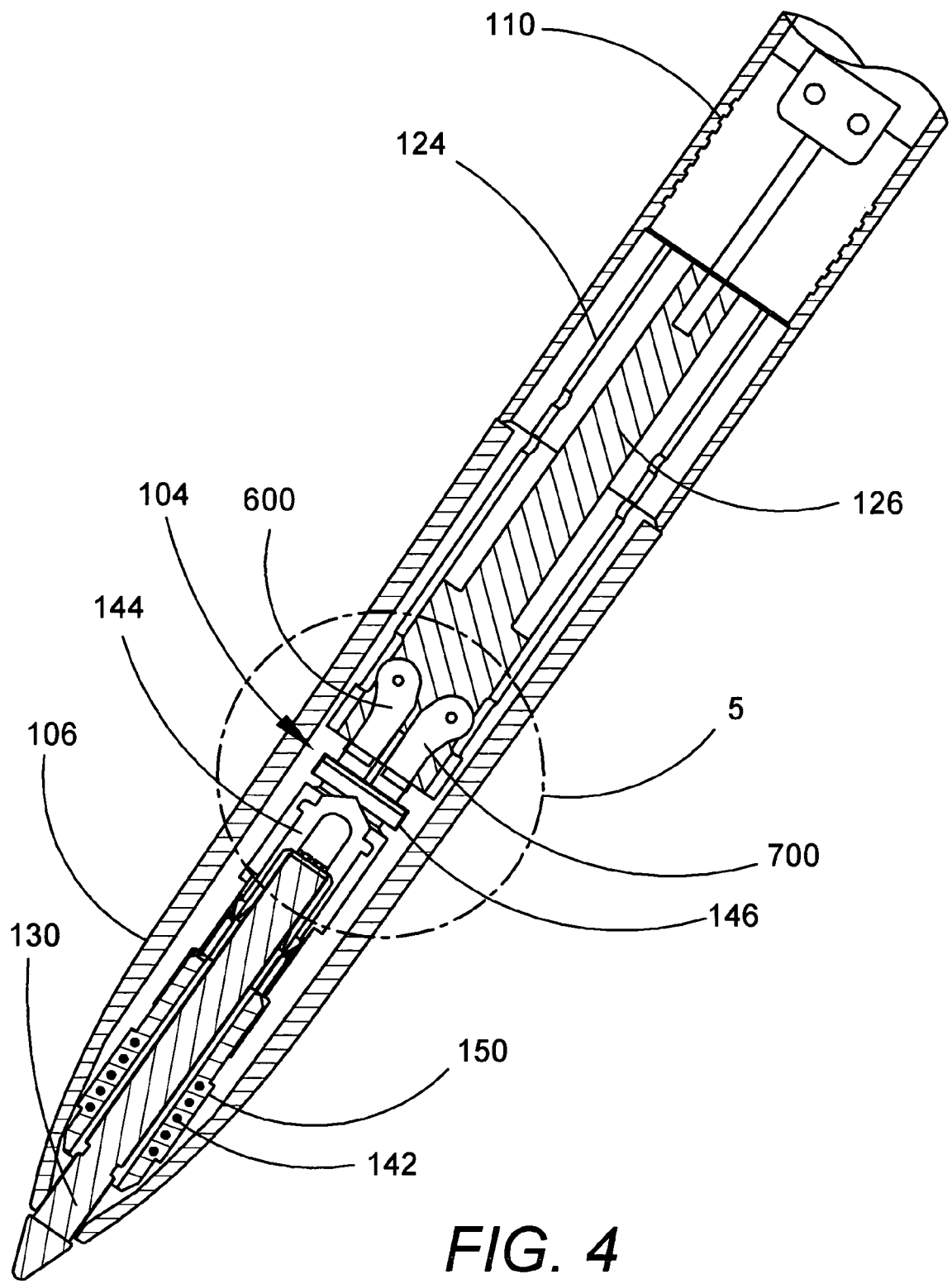
FIG. 4 is a cross-sectional view of a rear housing of the digitizer pen of FIG. 1 through cut-line 4—4.

FIG. 4 is a cross-sectional view of the rear housing 108 of the digitizer pen 100 through cut-line 4—4.

Figure 5:
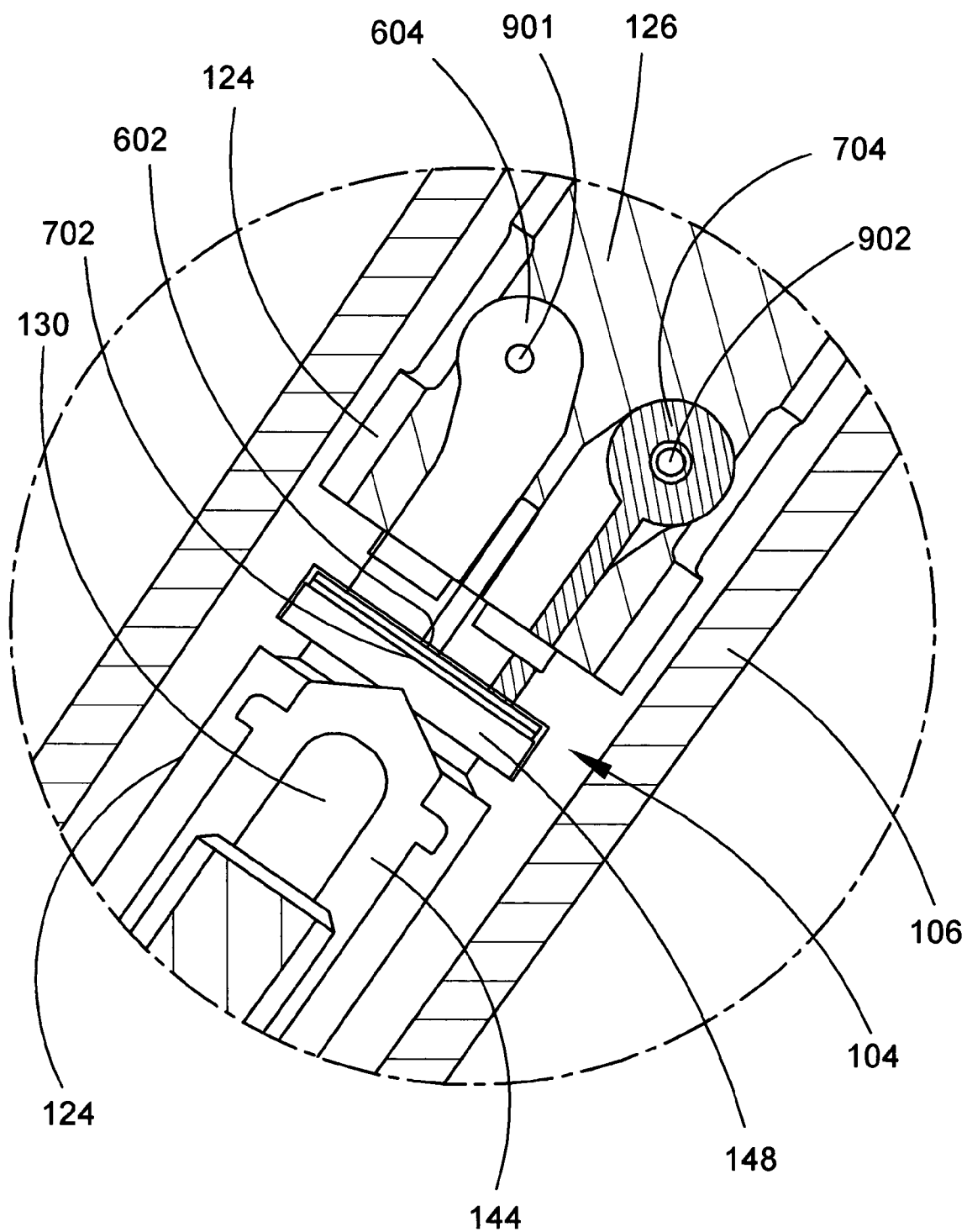
FIG. 5 is an enlargement of portion 5 of FIG. 4.

FIG. 5 is an enlargement of portion 5 of FIG. 4, showing part of the first printed component 600 and part of the second printed component 700, as assembled in the pen 100.

Figure 6:
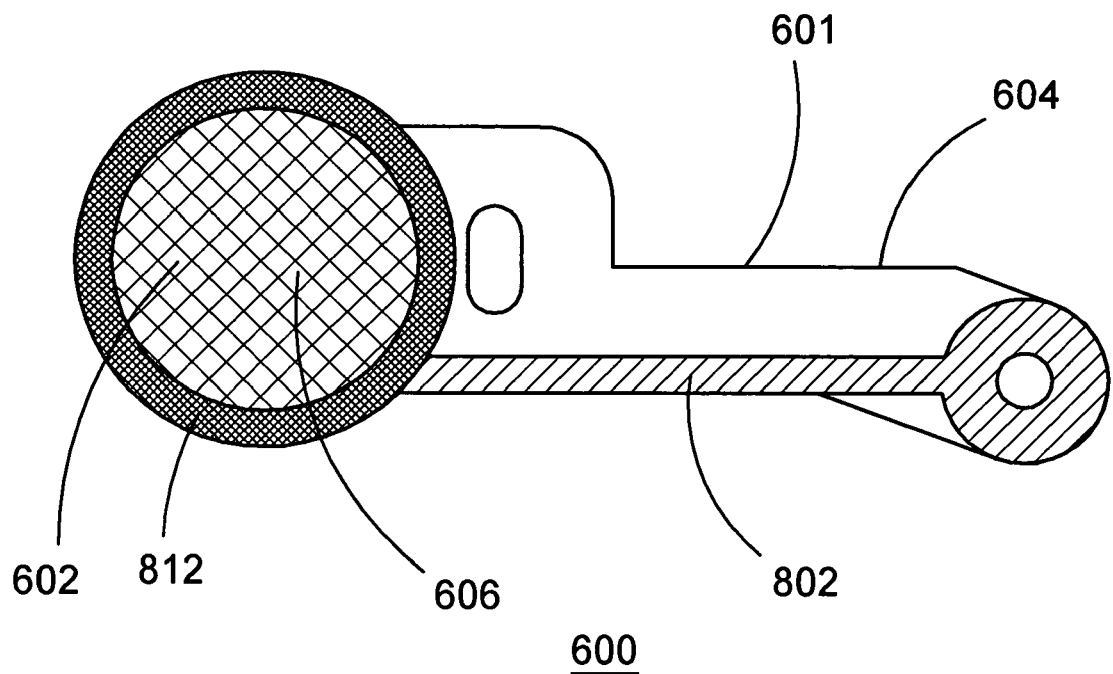
FIG. 6 is an enlarged plan view of one of two printed components prior to assembly.

FIG. 6 is an enlarged plan view of the first printed component 600 prior to assembly. The first printed component 600 comprises a first film 601 that includes a generally circular shaped (in a plan view) first sensor section 602 and a tail section 604.

Figure 7:
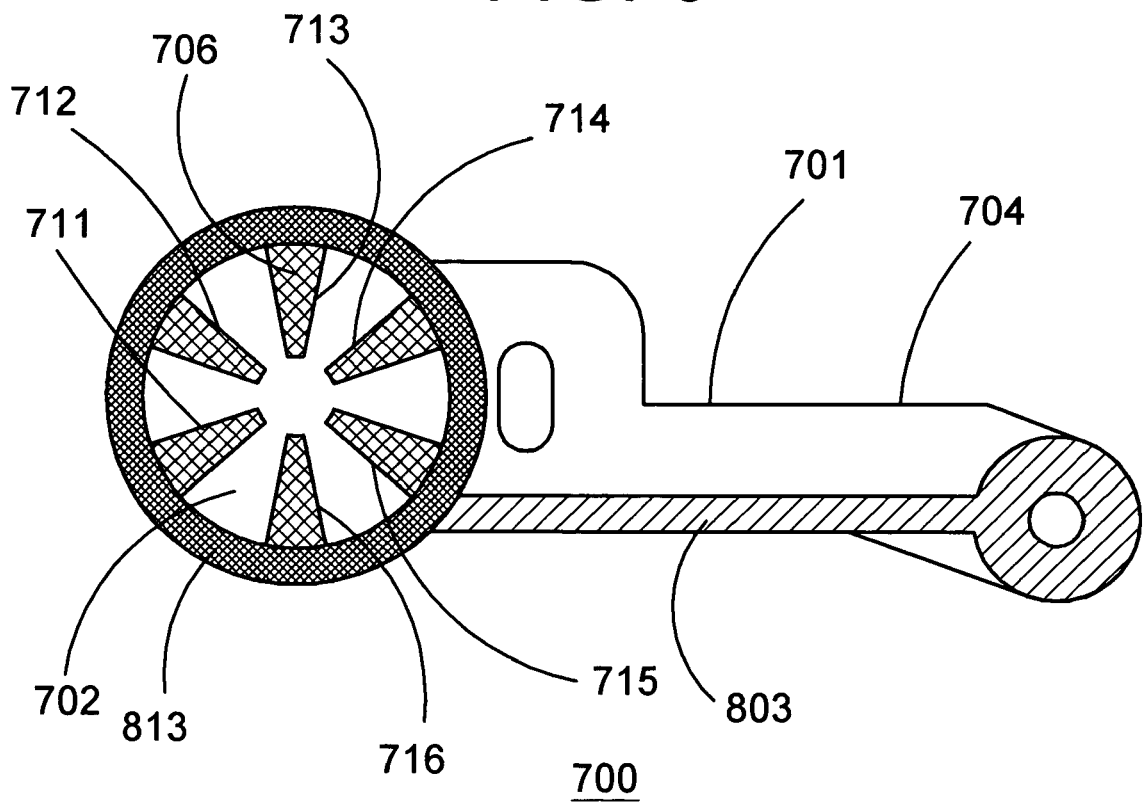
FIG. 7 is an enlarged plan view of another of the two printed components prior to assembly.

FIG. 7 is an enlarged plan view of the second printed component 700 prior to assembly. The second printed component 700 comprises a second film 701 that includes a generally circular shaped (in a plan view) second sensor section 702 and a tail section 704.

The films 601 and 602 are a base for building the printed components 600 and 700. First film 601 and second film 701 are flexible non-conductive films, preferably KAPTON®. Alternatively, the first film 601 and second film 701 are LEXAN®, nylon, FR4 material, paper, or a polyester film such as MYLAR®. The material used depends upon the type of connection used for connecting the pressure sensor 104 to the printed circuit board 126. For example, if solder is used for the connection, KAPTON is preferably used for the films 601 and 701 because of the high heat resistance of KAPTON. The first film 601 is substantially the same size as, and is shaped as mirror image of, second film 701. Each film 601 and 701 has an opposing surface that opposes, after the printed components 600 and 700 are assembled into the pressure sensor 104, the opposing surface of the other film. Ink is disposed, preferably silk screened, onto an opposing surface of first film 601 and onto an opposing surface of second film 701. Alternatively, the ink is pad printed. Advantageously, the ink has no significant amount of carbon.

In a first embodiment, a silver or another type of conductive, non-carbon ink 606 is disposed on the opposing surface of the first film 601. Preferably, the conductive, non-carbon ink is disposed on the opposing surface of the entire first sensor section 602 of the first film 601. A resistive, non-carbon ink 706 is disposed on the opposing surface of the second film 701. By the term "resistive ink", it is meant a pressure-sensitive ink. Preferably, the resistive, non-carbon ink is disposed on the opposing surface of the second sensor section 702 in the form of symmetrical, pie-shaped traces 711–716. By the term "trace" it is meant a shape of a functionally significant amount of ink printed or otherwise disposed on the surface, and does not refer to an insignificant amount of ink. Preferably, the resistive, non-carbon ink comprises a thermoplastic resin, silver, tin oxide and diethylene glycol monobutyl ether acetate.

In a second embodiment, the pie shaped portions 711–716 of the ink that are disposed on the opposing surface of the second sensor section 702 of the second film 701 comprise conductive, non-carbon ink. In the second embodiment, the resistive, non-carbon ink is disposed on the opposing surface of the entire first sensor section 602 of the first film 601. In other words, in both the first and second embodiments, one of the printed components 600 and 700 has the resistive, non-carbon ink, and the other printed component has the conductive, non-carbon ink.

Alternatively, instead of using the conductive, non-carbon ink to form a trace, a copper clad material is etched to form the trace. The position within the assembled pen 100 of the printed component having the pie-shaped traces is not critical. In other words, the printed component that has the pie-shaped traces could be in either of the two (2) positions shown for the printed components 600 and 700 within the assembled pen 100. As yet a further alternative, both films 601 and 701 have pie-shaped traces, and, as with the other embodiments, the ink disposed on at least one of the printed components is the resistive, non-carbon ink.

Figures 8, 9:
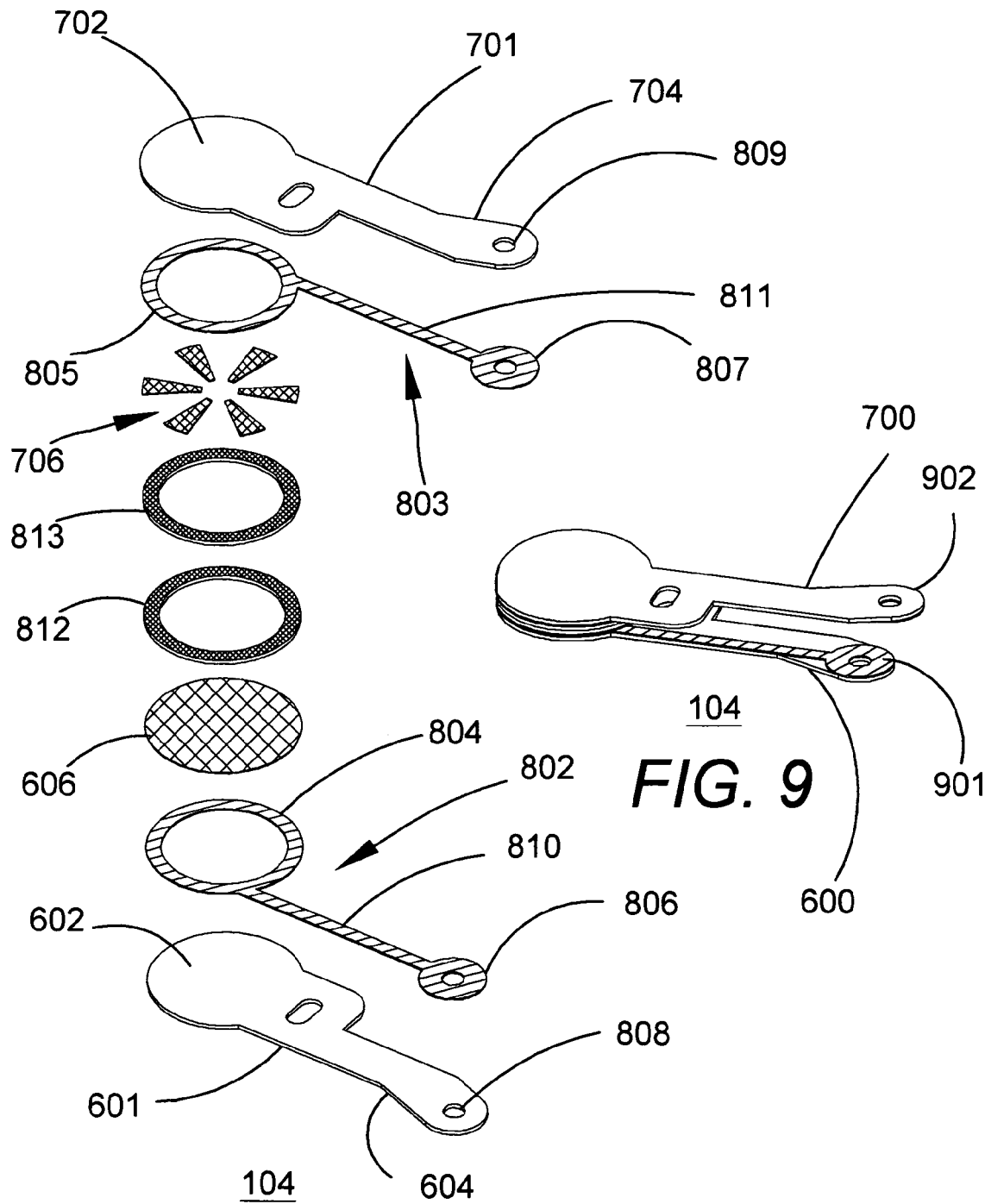
FIG. 8 is an exploded view of a pressure sensor.
FIG. 9 is an assembled view of the pressure sensor.

FIG. 8 is an exploded view of the pressure sensor 104. A conductive trace such as silver ink 802 is disposed on the opposing surface of film 601. The silver ink 802 is disposed in the form of a ring 804 near the circumference of the first sensor section 602, in the form of a smaller ring 806 around an opening 808 at the tail section 604, and in the form of an elongate section 810 electrically connecting the two rings 804 and 806. The conductive, non-carbon ink 606 is disposed on the entire first sensor section 602 including over the portion of the silver ink 802 on the first sensor section.

A spacer 812 is disposed on the first sensor section 602 over the conductive, non-carbon ink 606, in the form of a ring. The spacer 812 is preferably a dielectric insulator, and comprises a non-conductive material. The spacer 812 is disposed over the conductive, non-carbon ink 606. Preferably, the spacer 812 is insulated ink that is screen printed onto the film 601.

A conductive trace such as silver ink 803 is disposed on the opposing surface of film 701. The silver ink 802 is disposed in the form of a ring 805 near the circumference of the second sensor section 702, in the form of smaller ring 807 around an opening 809 at the tail section 704, and in the form of an elongate section 811 electrically connecting the two rings 805 and 807. The resistive, non-carbon ink 706 is disposed on the second sensor section 702 (including over the portion of the silver ink 802 on the second sensor section), in the form of symmetrical, pie-shaped portions 711–716.

Another spacer 813 is disposed in the form of a ring on the second sensor section 702 and over the resistive, non-carbon ink 706. The spacer 813 is disposed over the resistive, non-carbon ink 706 and over the silver ink 802. The spacer 813 is preferably a dielectric insulator, and comprises a non-conductive material. Preferably, spacer 813 is an insulated ink that is screen printed onto the film 701.

Preferably, the spacer 812 has a thickness of about 0.001–0.002 inch, and the other spacer 813 has a thickness of about 0.001–0.002 inch. The physical characteristics of the spacers 812 and 813 affect the start-up pressure. In particular, the thickness of the spacers 812 and 813 affects the start-up pressure. The thicker the spacers are, the higher is the start-up pressure. Alternatively, a single die-cut, pressure-sensitive adhesive rim, a single thin film material of another type, or a single insulated washer is used, having a thickness of about 0.002–0.004 inch, instead of the two spacers 812 and 813.

FIG. 9 is an assembled view of the pressure sensor 104. The inks are disposed upon the opposing surfaces of films 601 and 701. When assembled in the pen 100 as part of the pressure sensor 104, the opposing surface of the first sensor section 602 of the first printed component 600 abuts the opposing surface of the second sensor section 702 of the other second printed component 700. The pressure sensor has two terminals 901 and 902 at openings 808 and 809 that are electrically coupled to terminals 1701 and 1702, respectively, of the electronic circuit 116 on the printed circuit board 126 (see FIG. 17).

Movement of the elastomer 148 toward the pressure sensor 104 causes the second sensor section 702 to press against the first sensor section 602 because the first sensor section is substantially prevented from moving away from the second sensor section by portion 125. The force applied to the sensor sections 602 and 702 of the pressure sensor 104 is the input to the pressure sensor. The output of the pressure sensor 104 is the resistance or conductance between the terminals 901 and 902. As second sensor section 702 presses against first sensor section 602, the inks disposed thereon are pressed into intimate contact. As a result, the area of electrical contact between sensor sections increases, thereby changing the resistance or the conductance between the first printed component 600 and the second printed component 700. By the term "contact area" it is meant the sum of the individual contact areas, if any, of each trace 711–716 of ink on one sensor section with the ink on the other sensor section. Because the terminals 901 and 902 are electrically coupled to the inks on the sensor sections 602 and 702 via the highly conductive traces 802 and 803, the resistance or conductance between the terminals is proportional to the electrical contact area between the first sensor section 602 and the second sensor section 702. The electronic circuit 116 digitizes the output of the pressure sensor 104, and transmits wirelessly such data in a manner that is well known to persons skilled in the art.

FIGS. 10, 11 and 12 are plan views of four symmetrical patterns 1001, 1101 and 1201 of ink traces disposed on at least one of the films 601 and 701. Each pattern comprises a plurality of pie-shaped ink traces. The first pattern 1001 has narrow pie-shaped traces, the second pattern 1101 has intermediate pie-shaped traces, and the third pattern 1201 has wide pie-shaped traces. Angle 1202 of FIG. 12 and the corresponding angle (not indicated) in FIGS. 10 and 11, has the same value for each trace 711–716 within any one of the patterns 1001, 1101 and 1201. The symmetrical characteristic of the pattern of ink traces is advantageous because the contact area is substantially equal when the pressure is applied to the center 1000 of the pattern or when the pressure is applied off-centered. The pressure can be applied off-centered because of an imperfect assembly of the pen 100 or because the stylus 130 becomes off-center for any reason subsequent to assembly. The advantage of the symmetrical characteristic of the pattern of ink traces exists regardless of the reason for the pressure being applied off-centered. The pie-shape of the traces 711–716 is advantageous because the rate of change of resistance at the output of the pressure sensor 102 decreases as the input force to the pressure sensor increases (see FIG. 14). Advantageously, the rate of change at the output is controllable, in part, by preselecting the value of angle 1202. The smaller the value of angle 1202, the smaller is the rate of change in resistance at the output of the pressure sensor 102 in response to a change in pressure at the input of the pressure sensor. Preferably, there are six (6) pie-shaped traces 711–716 on at least one of the films 601 and 701 of the pressure sensor 102. Alternatively, a set of rectangular-shaped traces or a set of pie-shaped traces pointed in a direction opposite to the direction shown in FIG. 7, can produce a constant change in resistance at the output as the input pressure increases.

Referring now to FIG. 10, with six (6) traces, there are six (6) imaginary axes, A—A, C—C and E—E, through the center of each pair of pie-shaped trace, and three additional axes, B—B, D—D and F—F, through the spaces between the pie-shaped traces. If the face 145 of the tip holder 144 is off-centered along or near any of the six axes, the electrical contact area lost as a result of the face moving away from one or more pie-shaped traces, is gained by additional contact area with one or more other pie-shaped traces. For example, if the face 145 of the tip holder 144 is off-centered along or near axis E—E, and the face is at point 1004, the electrical contact area lost as a result of the face moving away from the pie-shaped trace 712, is gained by additional contact area with pie-shaped trace 715. Similarly, if the face 145 of the tip holder 144 is off-centered along or near axis B—B, and the face is at point 1005, the electrical contact area lost as a result of the face moving away from the pie-shaped traces 713 and 714, is gained by additional contact area with pies-shaped traces 711 and 716. Even numbers of pie-shaped traces are preferred. Practical numbers of pie-shaped traces are four (4), six (6) and eight (8). A pressure sensor 102 with an odd number of pie-shaped traces, such as three (3), five (5), seven (7) or nine (9), would be an improvement over the prior art, but would not be as advantageous as a pressure sensor with an even number of pie-shaped traces.

Referring now to FIG. 13, an alternative symmetrical pattern 1301 of ink traces also has the preferred number of six (6) traces. Each of the traces of pattern 1301 has a curved shape that advantageously allows a variable output of the pressure sensor 104 in response to a linear input force on the pressure sensor. It should be noted that the face 145 of the tip holder 144 deforms the elastomer when pressure is applied by the stylus. A larger void of ink near the center 1000 of the sensor section, such as in FIG. 13, results in a higher start-up pressure because the face 145 of the tip holder 144 needs to flatten the elastomer 148 more (as compared to FIG. 12) before most of the inks on the sensor sections 602 and 702 make electrical contact.

Figure 14:
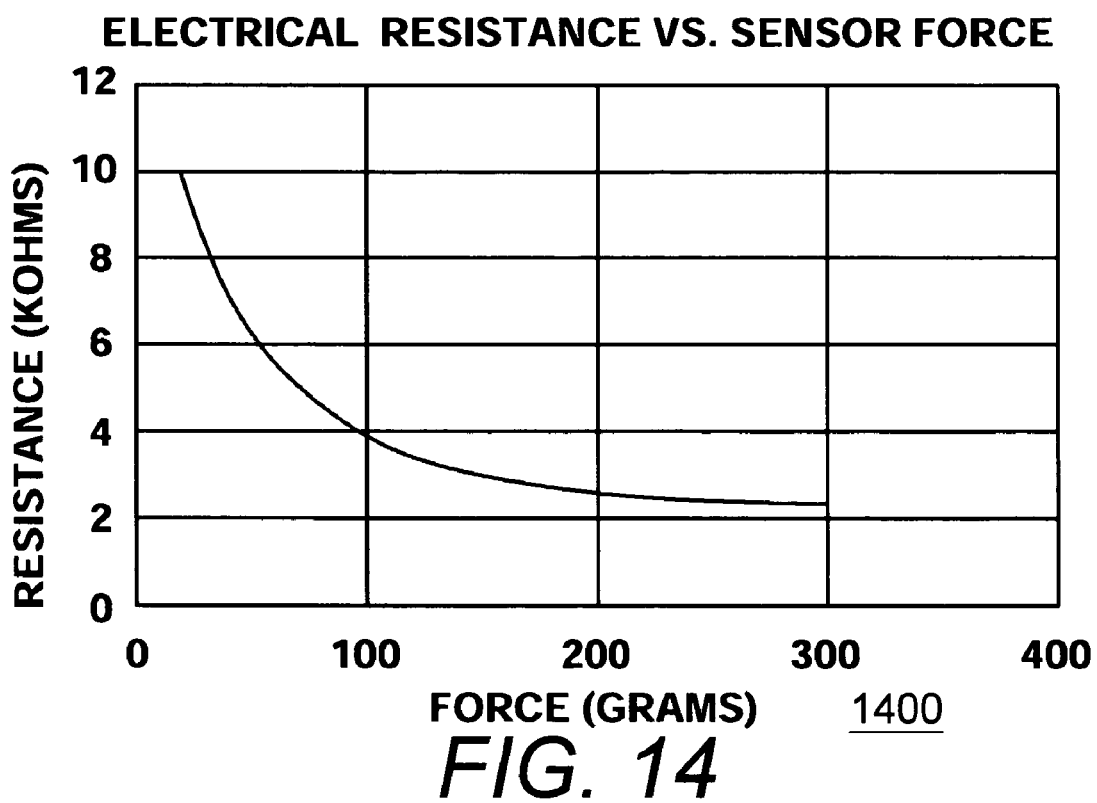
FIG. 14 is a graph of electrical resistance versus force applied to the pressure sensor.

FIG. 14 is a graph of a curve 1400 of resistance versus force applied to the pressure sensor 104, (hereinafter, the "pressure curve of the sensor"). Referring again to FIG. 12, the angle 1202, affects the shape of the pressure curve of the sensor. The larger the value of the angle 1202, the faster the resistance of the output of the pressure sensor 104 drops as the input pressure to the pressure sensor increases.

Figure 15:
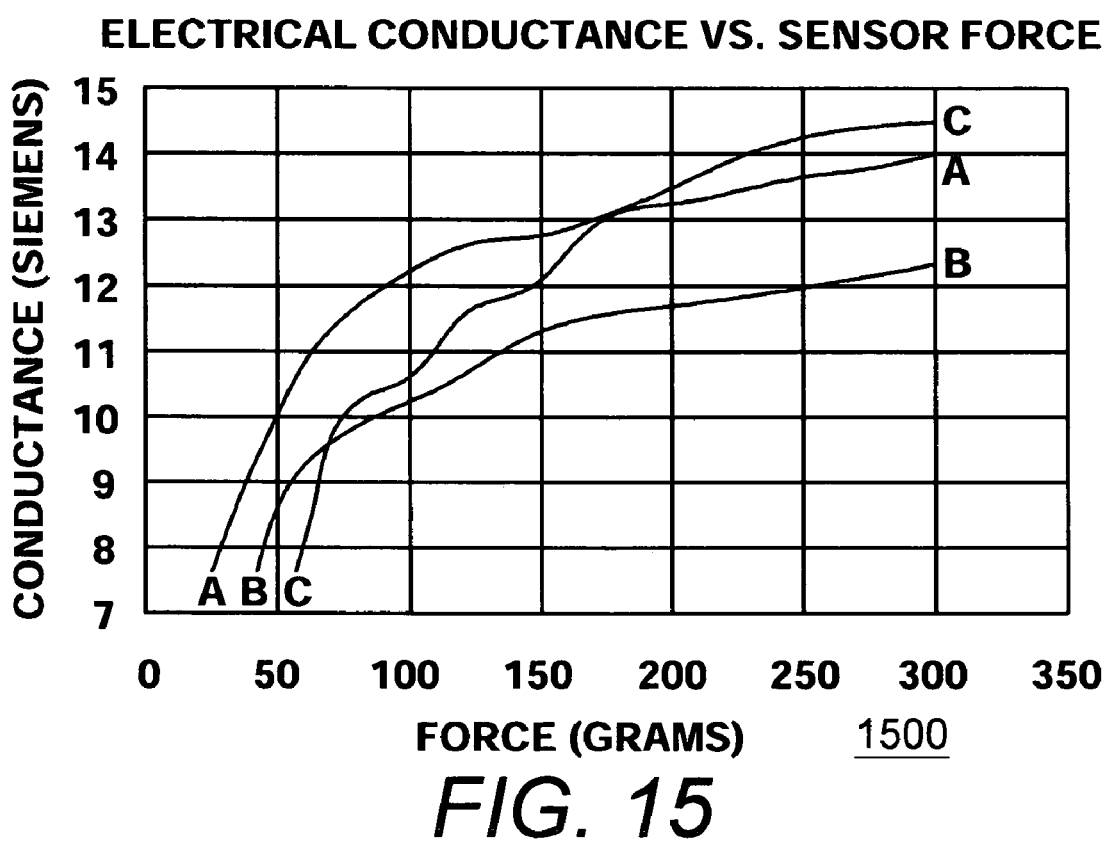
FIG. 15 is a graph of experimental data of electrical conductance versus force applied to the pressure sensor, for three different radii of a face of a tip holder of the digitizer pen.

Preferably, the face 145 of the tip holder 144 is spherical; alternatively the face is conical. If the face 145 of the tip holder 144 is spherical, the conductance resulting from a given force, or pressure, varies depending upon the radius of the face. FIG. 15 is a graph 1500 of experimental data of electrical conductance versus force applied to the pressure sensor 104, for three different radii of the face 145 of the tip holder 144. The tip holder 144 can exert 15–500 grams of force on the pressure sensor 104; although more typically, the tip holder exerts 30–300 grams of force on the pressure sensor. As a first example, curve A—A is a graph of sensor conductance versus sensor force when the face 145 has a radius of 0.06 inch. About 150 grams of force results in almost 13 siemens, or mhos, of conductance when the face 145 of the tip holder 144 has a radius of about 0.06 inch. As a second example, curve B—B is a graph of sensor conductance versus sensor force when the face 145 has a radius of 0.08 inch. About 150 grams of force results in about 12 siemens of conductance when the face 145 has a radius of about 0.08 inch. As a third example, curve C—C is a graph of sensor conductance versus sensor force when the face 145 has a radius of 0.144 inch. About 150 grams of force results in less than 11.5 siemens of conductance when the face 145 has a radius of about 0.144 inch. Therefore, in response to the force changing from a low force to 150 grams, the conductance rises at the fastest rate when the face 145 of the tip holder 144 is the sharpest.

The startup pressure is determined, in part, by the shape of the face 145 of the tip holder 144. A more pointed face 145 produces a lower start-up pressure because the face 145 penetrates the elastomer 148 a certain distance prior to moving the elastomer and displacing the sensor 104. A first example is curve A—A, which is a graph of sensor conductance versus sensor force when the face 145 has a radius of 0.06 inch. The start-up pressure is about 30 grams for curve A—A. A duller face 145 produces a higher start-up pressure because the face 145 does not penetrate the elastomer 148 any significant distance; rather, the face starts to move the elastomer and displace the sensor 104 sooner after force is applied, thereby producing an output signal while the applied force is low. A second example is curve B—B, which is a graph of sensor conductance versus sensor force when the face 145 has a radius of 0.08 inch. The start-up pressure is about 45 grams for curve B—B. A third example is curve C—C, which is a graph of sensor conductance versus sensor force when the face 145 has a radius of 0.144 inch. The start-up pressure is about 60 grams for curve C—C. Therefore, the start-up pressure is the lowest when the face 145 is the sharpest, and the start-up pressure is the highest when the face is the dullest.

Advantageously, the start-up pressure is also controllable by preselection of the thickness and material of the elastomer 148. Generally, a thicker elastomer 148 results in a higher start-up pressure, and a thinner elastomer results in a lower start-up pressure. A softer elastomer 148 generally results in a lower start-up pressure, and a harder elastomer generally results in a higher start-up pressure.

Figure 16:
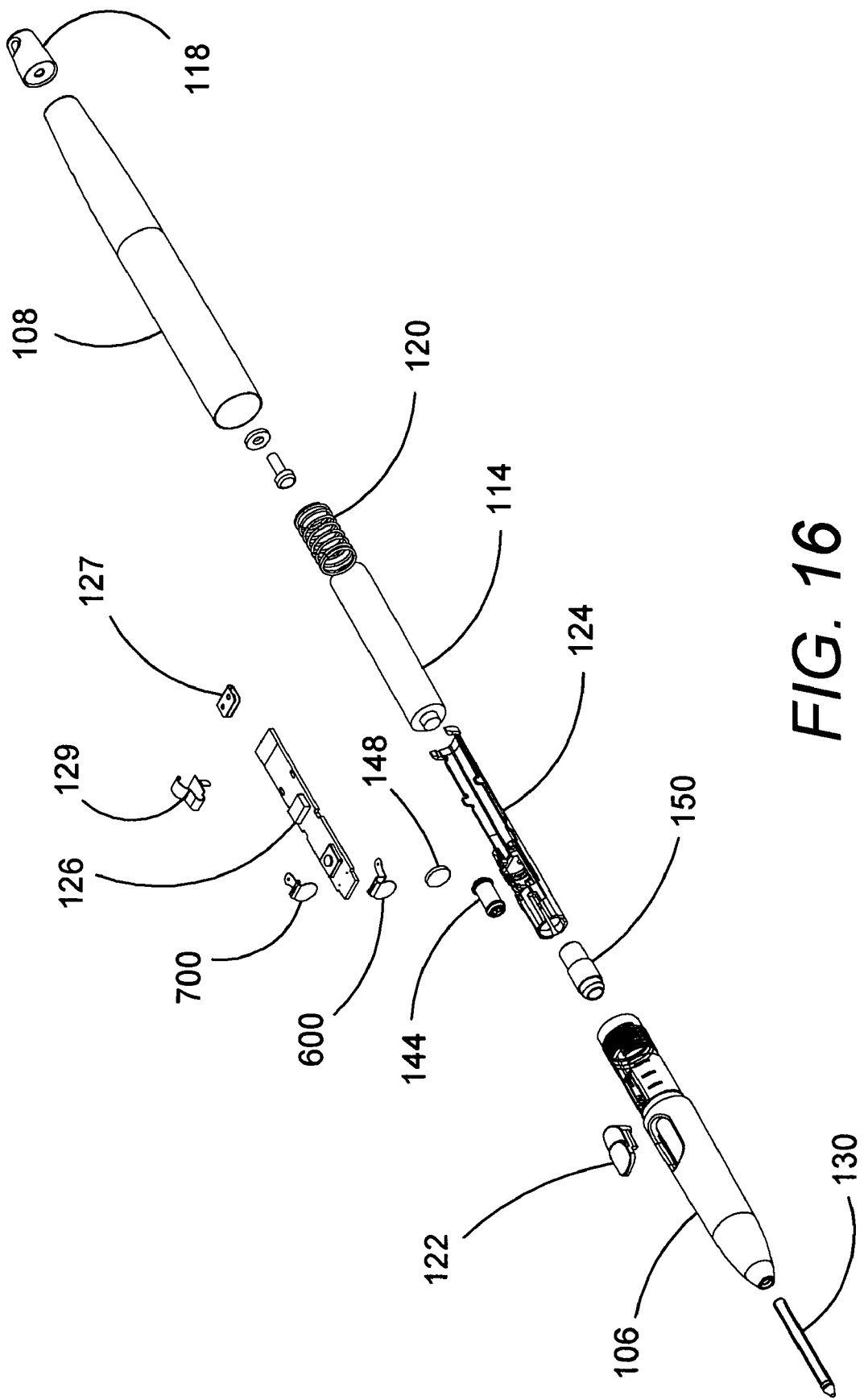
FIG. 16 is an exploded view of the digitizer pen.

FIG. 16 is an exploded view of the digitizer pen 100. In FIG. 13, the pressure sensor 104 is used as a tip switch, and the side button 122 is used as a momentary contact. Alternatively, the pressure sensor 104 is mechanically coupled to the side button 122, or a second pressure sensor (not shown) is mounted under the side button 122, and the side button is used for controlling an airbrush in an artist software package.

Figure 17:
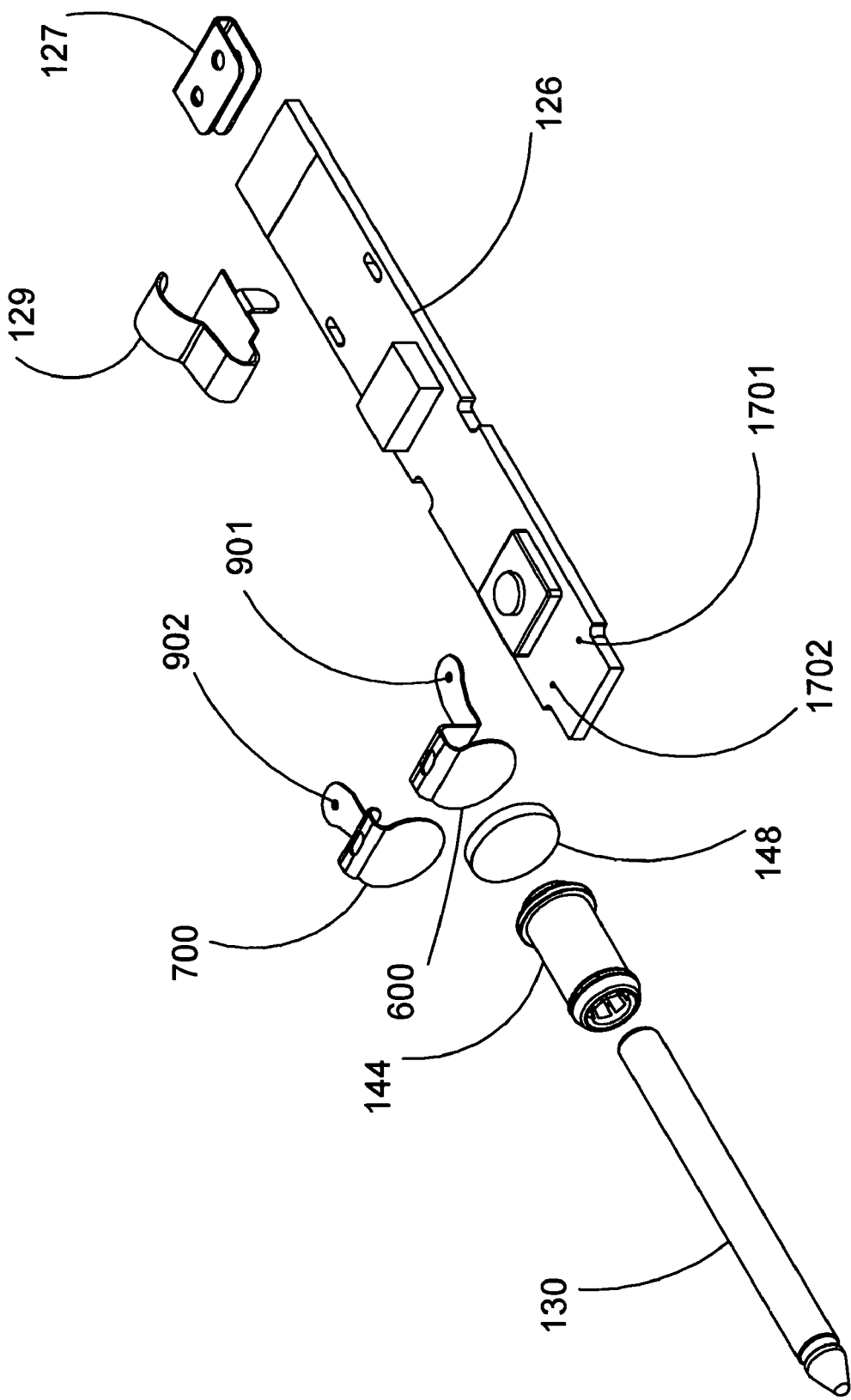
FIG. 17 is an exploded view of the pressure sensor area of the digitizer pen.

FIG. 17 is an exploded view of the pressure sensor area 1700 of the digitizer pen 100. In FIG. 17, the first printed component 600 and the second printed component 700 are shown bent into approximately their installed shape within the pen 100.

Figure 18:
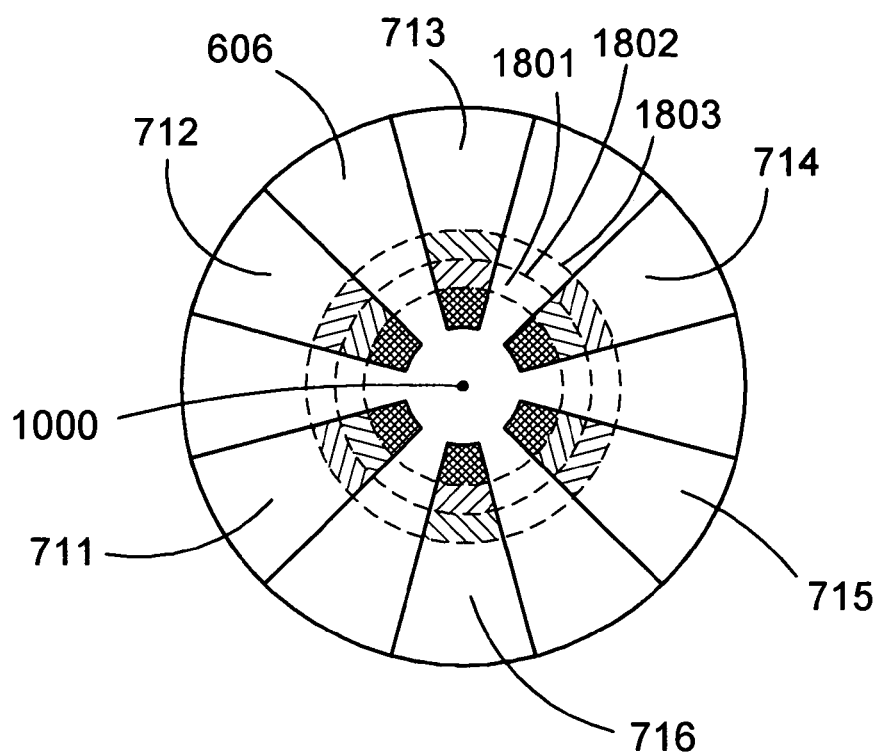
FIG. 18 is a simplified diagram showing areas of contact between the two printed components resulting from three different amounts of force on the pressure sensor, when the force is applied to a center of the pressure sensor.

FIG. 18 is a simplified diagram showing areas of contact between the two printed components 600 and 700 resulting from three (3) different amounts of force applied to the center 1000 of the pressure sensor 104. The shaded portions within smaller circle 1801 represent the contact area between printed components 600 and 700 caused by a lesser pressure applied to the pressure sensor 104, such as when an input force of 100 grams is applied to the pressure sensor. The shaded portions within intermediate circle 1802 represent the contact area between printed components 600 and 700 caused by a medium amount of pressure applied to the pressure sensor 104, such as when an input force of 200 grams is applied to the pressure sensor. The shaded portions within larger circle 1803 represent the contact area between printed components 600 and 700 caused by a greater pressure applied to the pressure sensor 104, such as when an input force of 300 grams is applied to the pressure sensor. It should be noted that the radii that define smaller circle 1801, intermediate circle 1802 and larger circle 1803 do not necessarily increase linearly with an increase in pressure. The rate of increase in such radii with increasing pressure depends upon, among other things, the shape of the face 145 of the tip holder 144. Advantageously, the shape of the face 145 of the tip holder 144 is preselectable to produce a desired response from the pressure sensor 102. In the example shown in FIG. 18, the shape of the face 145 of the tip holder 144 was preselected to produce an approximately linear increase in such radii with an increase in pressure.

Figure 19:
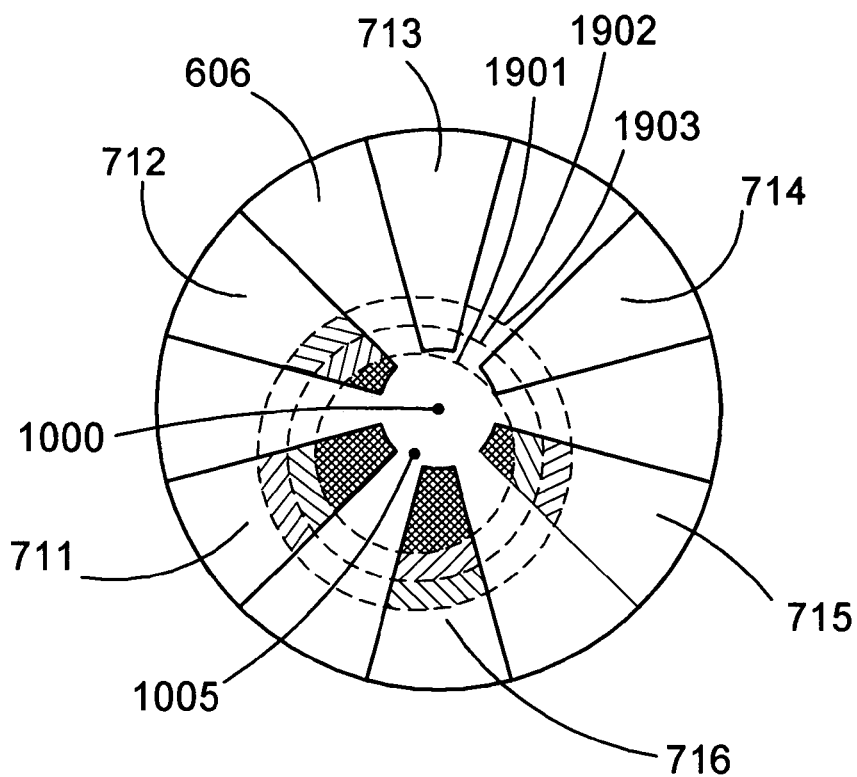
FIG. 19 is a simplified diagram showing other areas of contact between the two substrates resulting from the same three different amounts of force on the pressure sensor, when the force is applied to the pressure sensor off-centered.

FIG. 19 is a simplified diagram showing other areas of contact between the two printed components 600 and 700 resulting from the same three (3) different amounts of force applied to the pressure sensor 104, when the force is applied to the pressure sensor off-centered, such as at point 1005. The shaded portions within smaller circle 1901 represent the contact area between printed components 600 and 700 caused by a lesser pressure, such as 100 grams, applied off-centered to the pressure sensor 104. The shaded portions within intermediate circle 1902 represent the contact area between printed components 600 and 700 caused by a medium pressure, such as 200 grams, applied off-centered to the pressure sensor 104. The shaded portions within larger circle 1903 represent the contact area between printed components 600 and 700 caused by a greater pressure, such as 300 grams, applied off-centered to the pressure sensor 104.

Referring now to FIGS. 18 and 19, the size of the shaded contact area within smaller circle 1901 caused by the force applied off-centered is advantageously approximately the same as the size of the shaded contact area within smaller circle 1801 caused by the force applied at the center of the pressure sensor 104. Similarly, the size of the shaded contact area within intermediate circle 1902 caused by the force applied off-centered is advantageously approximately the same as the size of the shaded contact area within intermediate circle 1802 caused by the force applied at the center of the pressure sensor 104. Similarly, the size of the shaded contact area within larger circle 1903 caused by the force applied off-centered is advantageously approximately the same as the size of the shaded contact area within larger circle 1803 caused by the force applied at the center of the pressure sensor 104.

Figure 20:
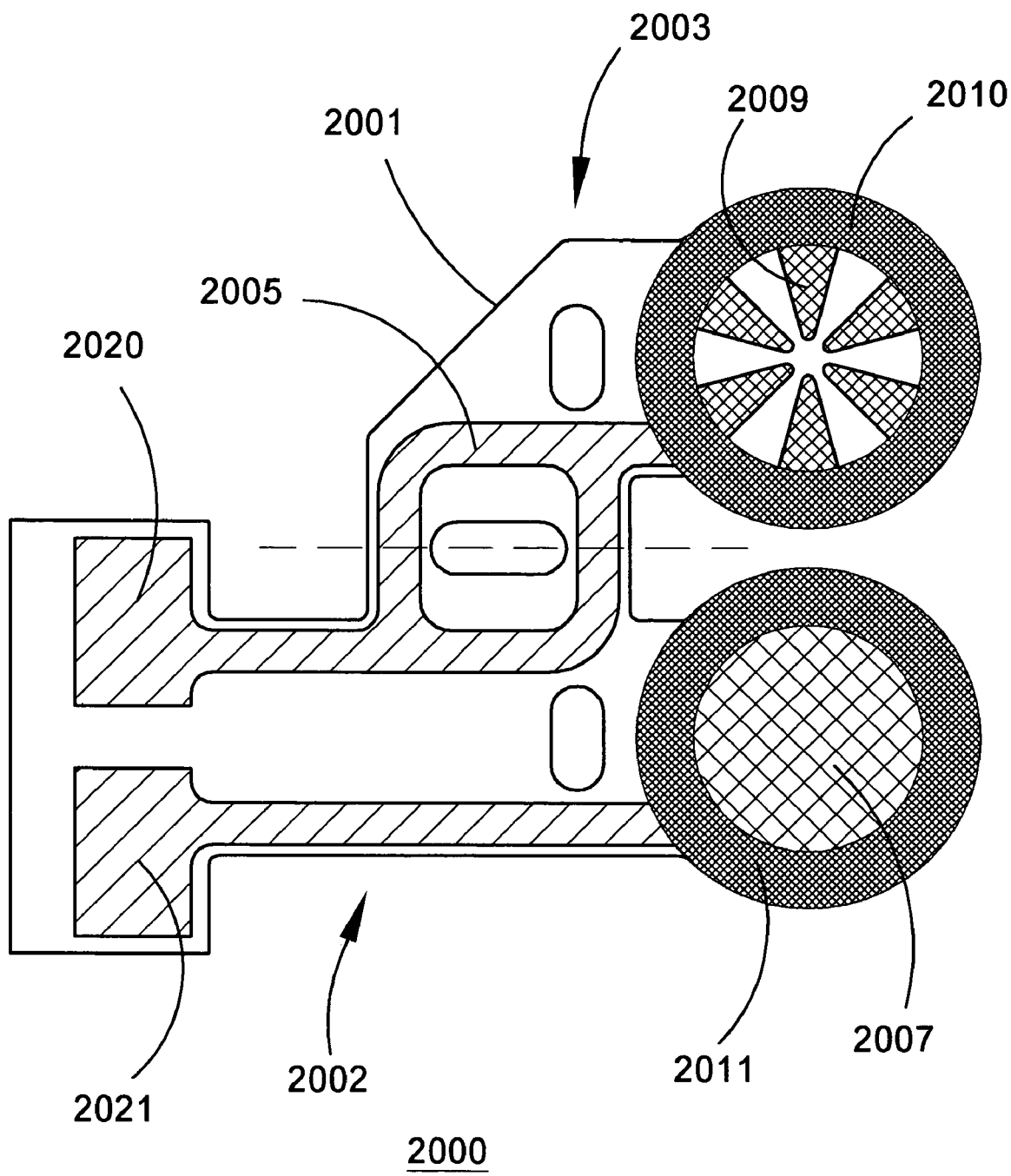
FIG. 20 is an enlarged plan view of a single printed component, prior to folding and assembly.

FIG. 20 is an enlarged plan view of a single printed component 2000, prior to folding and assembly. The single printed component comprises one film 2001. Alternatively, the first printed component 600 and the second printed component 700 are replaced by the single printed component 2000. The single printed component is folded at the fold line as indicated by the dashed line in FIG. 20, so that the one film 2001 is foldable into the shape of the pressure sensor 102, somewhat as shown in FIG. 9. The one film 2001 comprises a first portion 2002 and a second portion 2003 on either side of the fold line. The first portion 2002 corresponds to film 601, and the second portion 2003 corresponds to film 701. The one film 2001 has a silver ink trace 2005, a conductive, non-carbon ink trace 2007, a resistive, non-carbon ink trace 2009, and spacers 2010 and 2011 disposed thereupon as indicated in FIG. 20. The single printed component 2000 has terminals 2020 and 2021. The inks disposed on the one film 2001 to form the single printed component 2000 are similar to the inks disposed on films 601 and 701 to form the first printed component 600 and the second printed component 700; therefore, the single printed component will not be described in further detail.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

LIST OF REFERENCE NUMERALS

| | |
|---|---|
| 100 | Digitizer pen ("pen") |
| 102 | Barrel |
| 104 | Pressure sensor |
| 106 | Front Housing |
| 108 | Rear Housing |
| 110 | Threaded Junction |
| 112 | Compartment |
| 114 | Battery |
| 116 | Electronic circuit |
| 117 | One end of pen |
| 118 | End cap |
| 120 | Spring |
| 122 | Side button |
| 124 | Inside holder |
| 125 | Portion of inside holder |
| 126 | Printed circuit board |
| 127 | Battery contact |
| 129 | Clip |
| 130 | Stylus |
| 132 | Opening |
| 133 | Another end of stylus |
| 134 | Another end of pen |
| 136 | Writing tip |
| 144 | Tip holder |
| 145 | Face of tip holder |
| 146 | End of stylus |
| 148 | Elastomer disk ("elastomer") |
| 150 | Bobbin |
| 152 | Coil |
| 600 | First printed component |
| 601 | First film |
| 602 | First sensor section |
| 604 | Tail section |
| 700 | Second printed component |
| 701 | Second film |
| 702 | Second sensor section |
| 704 | Tail section |
| 711–716 | Trace |
| 802 | Silver ink |
| 803 | Silver ink |
| 804 | Ring |
| 805 | Ring |
| 806 | Smaller ring |
| 807 | Smaller ring |
| 808 | Opening |
| 809 | Opening |
| 810 | Elongate section |
| 811 | Elongate section |
| 812 | Spacer |
| 813 | Spacer |
| 901 | Terminal |
| 902 | Terminal |
| 1001 | Pattern |
| 1004 | Point |
| 1005 | Point |
| 1101 | Pattern |
| 1201 | Pattern |
| 1202 | Angle |
| 1400 | Resistance versus force curve |
| 1500 | Graph |
| 1301 | Pattern |
| 1700 | Pressure sensor area |
| 1701 | Terminal |
| 1702 | Terminal |
| 1801 | Smaller circle |
| 1802 | Intermediate circle |
| 1803 | Larger circle |

-continued

| | |
|---|---|
| 1901 | Smaller circle |
| 1902 | Intermediate circle |
| 1903 | Larger circle |
| 2000 | Single printed component |
| 2001 | One film |
| 2002 | First portion |
| 2003 | Second portion |
| 2005 | Silver ink trace |
| 2007 | Conductive, non-carbon ink trace |
| 2009 | Resistive, non-carbon ink trace |
| 2010 | Spacer |
| 2011 | Spacer |
| 2020 | Terminal |
| 2021 | Terminal |

We claim:

1. In a digitizer pen, a pressure sensor, comprising:
a first sensor section having a non-carbon ink disposed thereon; and
a circular second sensor section having a non-carbon ink disposed thereon, the second sensor section abutting the first sensor section, said second sensor section having a center with a plurality of traces of the non-carbon ink disposed thereon in a pattern symmetrical about the center of the sensor section.

2. The pressure sensor of claim 1 in which at least one of the first sensor section and the second sensor section has a resistive, non-carbon ink disposed thereupon.

3. The pressure sensor of claim 1 in which at least one of the first sensor section and the second sensor section is circular having a center and has a plurality of traces of the non-carbon ink disposed thereon in a pattern symmetrical about the center of the sensor section.

4. The pressure sensor of claim 3 in which at least one of the first sensor section and the second sensor section has a resistive, non-carbon ink disposed thereupon.

5. A pressure sensor for a digitizer pen, comprising:
a first sensor section having a conductive, non-carbon ink disposed thereon; and
a second sensor section having a resistive, non-carbon ink disposed thereon, the second sensor section abutting the first member, and in which the resistive, non-carbon ink includes
thermoplastic resin,
silver,
tin oxide, and
diethylene glycol monobutyl ether acetate.

6. The pressure sensor of claim 5, including an elastomer abutting at least one of the first sensor section and the second sensor section.

7. A digitizer pen, comprising:
a pressure sensor mounted within the digitizer pen, the pressure sensor having output terminals, a circular first sensor section and a circular second sensor section abutting the circular first sensor section, in which at least one of the circular first sensor section and the circular second sensor section has a plurality of traces of a non-carbon ink disposed thereon in a pattern symmetrical about the center of the sensor section; and
a stylus movably mounted to the digitizer pen, the stylus having a writing tip for touching a sensing surface and an end, opposite the writing tip, for applying force to the pressure sensor, such that an electrical conductance between the output terminals is proportional to the force, and such that, the electrical conductance in response to a given amount of force applied by the end of the stylus to the pressure sensor at the center is substantially the same as the electrical conductance in response to the given amount of force applied by the end of the stylus to the pressure sensor off-centered.

8. The digitizer pen of claim 7 including a tip holder movably mounted to the digitizer pen, and in which the stylus is removably mounted to the tip holder, such that the electrical conductance in response to a given amount of force applied by tip holder to the pressure sensor at the center is substantially the same as the electrical conductance in response to the given amount of force applied by the tip holder to the pressure sensor off-centered.

9. The digitizer pen of claim 8, in which the pressure sensor has a start-up pressure, such that the start-up pressure is determined in part by the shape of a face of the tip holder.

10. The digitizer pen of claim 7, in which at least one of the circular first sensor section and the circular second sensor section has a resistive, non-carbon ink disposed thereupon.

11. The digitizer pen of claim 9, in which the pressure sensor includes a first sensor section having a conductive, non-carbon ink disposed thereon; and a second sensor section having a resistive, non-carbon ink disposed thereon.

12. A pressure sensor in a digitizer pen, the digitizer pen including a stylus for applying force to the pressure sensor, the pressure sensor comprising:
a first circular sensor section having a plurality of traces of a non-carbon ink disposed thereon in a pattern symmetrical about the center of the sensor section, a second circular sensor section and
two output terminals, such that an electrical conductance between the two output terminals is responsive to force applied by the stylus on the pressure sensors, and such that a change in electrical conductance between the two output terminals in response to a change in force applied by the stylus to the pressure sensors is selectable by preselecting the shapes of the traces and the size of the traces.

* * * * *